(No Model.)  3 Sheets—Sheet 1.

W. M. GOODRIDGE.
CABLE RACK.

No. 472,947. Patented Apr. 12, 1892.

Witnesses.
Chas. G. Hawley.
Chas. C. Woodworth

Inventor.
Wm. M. Goodridge
By George P. Barton
atty.

(No Model.) 3 Sheets—Sheet 2.
W. M. GOODRIDGE.
CABLE RACK.
No. 472,947. Patented Apr. 12, 1892.
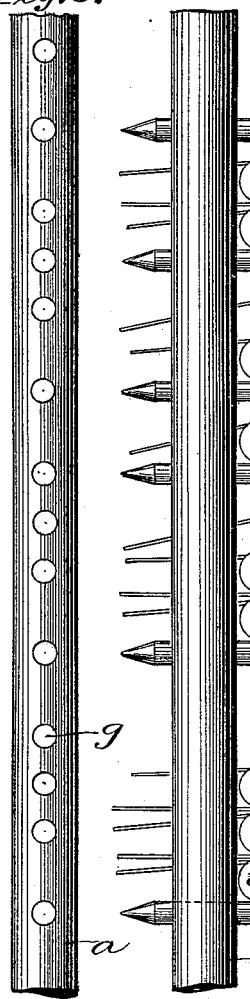
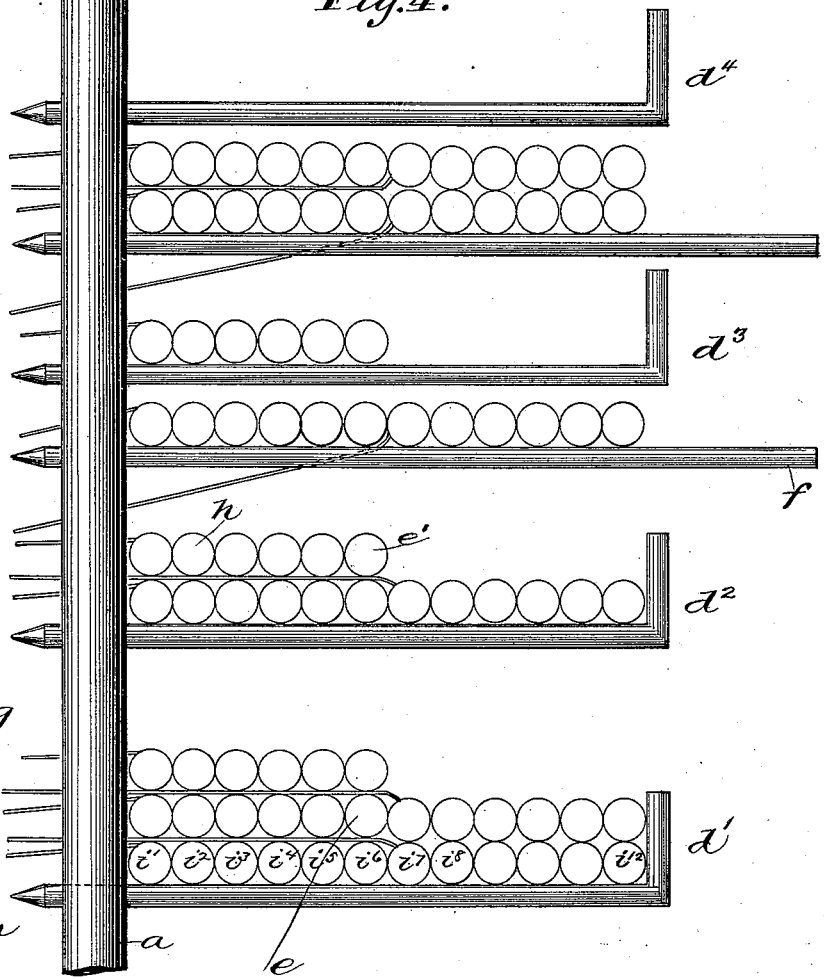
Witnesses.
Chas. G. Hawley.
Albert H. Parker.
Inventor.
William M. Goodridge
By George P. Barton
Attorney.

(No Model.) 3 Sheets—Sheet 3.

W. M. GOODRIDGE.
CABLE RACK.

No. 472,947. Patented Apr. 12, 1892.

Witnesses:
Chas. G. Hawley.
Ella Edler

Inventor:
William M. Goodridge.
By George P. Barton
Attorney.

UNITED STATES PATENT OFFICE.

WILLIAM M. GOODRIDGE, OF HIGHLAND PARK, ASSIGNOR TO THE WESTERN ELECTRIC COMPANY, OF CHICAGO, ILLINOIS.

CABLE-RACK.

SPECIFICATION forming part of Letters Patent No. 472,947, dated April 12, 1892.

Application filed November 30, 1888. Serial No. 292,236. (No model.)

*To all whom it may concern:*

Be it known that I, WILLIAM M. GOODRIDGE, a citizen of the United States, residing at Highland Park, in the county of Lake and State of Illinois, have invented a certain new and useful Improvement in Cable-Racks, (Case No. 10,) of which the following is a full, clear, concise, and exact description, reference being had to the accompanying drawings, forming a part of this specification.

My invention relates to devices for supporting the electric cables at the rear of switchboards; and its object is, primarily, to relieve the portion of the switchboard-frame which carries the sections of the spring-jack switches from the weight of the cables, and at the same time provide ready means for taking out any one of the cables, together with the strips of the spring-jack switches with which its conductors are connected. This is especially desirable in multiple-switchboard systems in which a large number of cables are required. Multiple switchboards are built up in sections, each section or board consisting of the same number of divisions. At the rear of the upright between the different divisions I provide, preferably, a gas-pipe which is provided with holes, through which the pins which carry the cables may be inserted. The pins may be turned up at their outer ends, so as to prevent the cable from slipping off at the rear, or they may be left straight, yet long enough to avoid the possibility of the cable falling off.

My invention is illustrated in the accompanying drawings, in which—

Figure 3:
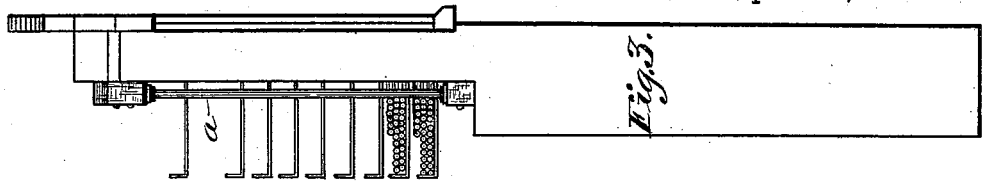
Figure 1:
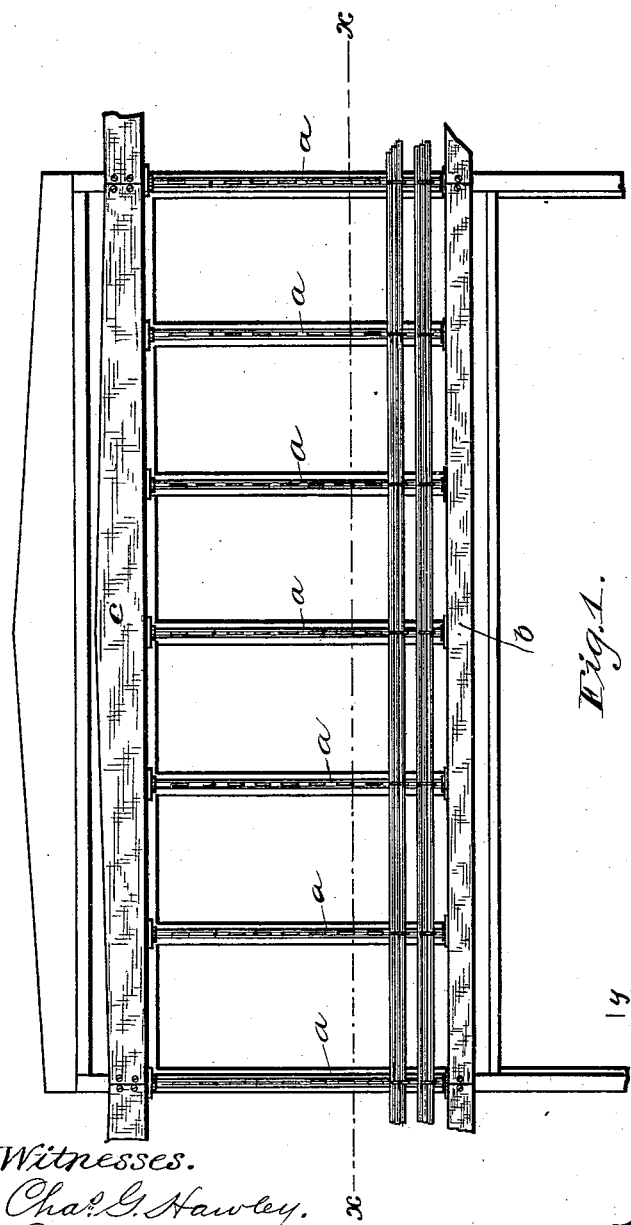
Figure 2:
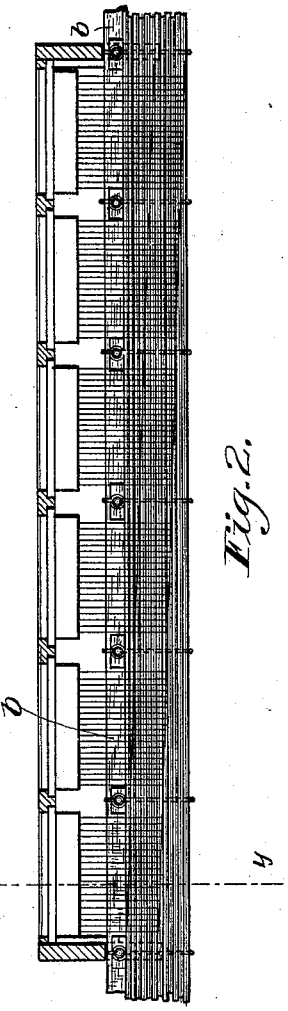
Figure 6:
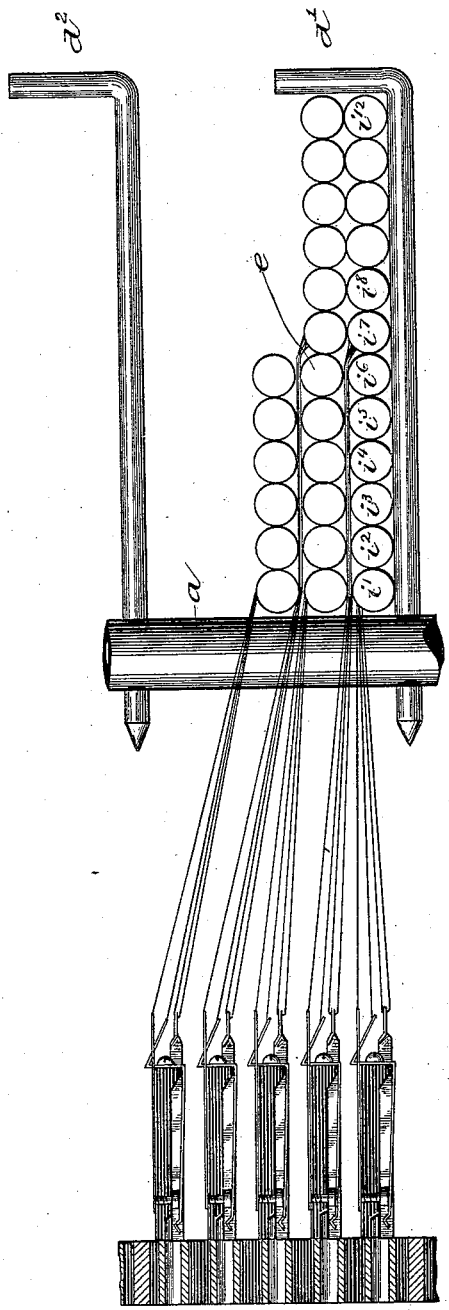

Figure 1 is a rear view of a section of a multiple switchboard, consisting of six divisions, illustrative of my invention. Fig. 2 is a plan view upon section-line X X of Fig. 1. Fig. 3 is an end view of a section of a multiple switchboard. Fig. 4 is a detailed view showing the manner of supporting the cable and providing room for removing any one of them. Fig. 5 is an elevation showing the gas pipe or tube provided with holes for the supporting-pins. Fig. 6 is a detailed sectional view upon line Y Y of Fig. 2.

As shown in Figs. 1, 2, and 3, it will be seen that the cables are supported at the rear upon pins and extend directly from one board or section to another in the well-known manner.

I have not deemed it necessary to illustrate in detail the manner of connecting the wires of the different cables with the different strips of the spring-jack switches. As is well known, the wires of each cable are connected with the corresponding strips of spring-jack switches upon the different switchboards or sections.

Heretofore the pins have been inserted directly into the uprights—the upright pieces of the frame which carry the spring-jack switches. The weight of the cables thus resting upon the uprights caused the frame to sag.

The pipes $a$ are supported between the rails $b$ and $c$, as shown in the drawings. There are six divisions, and consequently six supporting-pipes, to each section or each board. The pipes are secured between the two rails $b$ $c$ at suitable distances apart in any suitable manner. I preferably provide at the top and bottom of each a casting, which may be of brass or iron. These castings are screwed onto the ends of the pipes, and are then secured in proper position to the rails by means of wood screws. The rack thus formed, consisting of two rails and the required number of supporting-pipes, is placed at the rear of the boards and supported upon the legs, as shown in Figs. 1, 2, and 3.

Referring now to Fig. 4, it will be seen that the pins $d'$ $d^2$ $d^3$ $d^4$ are inserted into the proper holes provided in the pipe. The cables are laid upon these pins in the usual manner. When it is desired to remove any one of the cables, an extra pin is inserted below all the cables at the rear of the one which is to be removed and above all the cables above the one, and the cables at the rear and above being lifted the particular cable may be readily taken out. Thus normally the cables may be laid, as shown in Fig. 4, upon $d'$. Suppose it is desired to remove cable $e$ of the group. The cables in the same layer at the rear of $e$ and the cables in the layer above the cable $e$ being raised access may be had to cable $e$. Thus is illustrated with respect to the cable supported normally by pin $d^2$. It being desired to remove cable $e'$, the pin $f$ is inserted under the cable at the rear of cable $e'$ and under the layer above and the pin $f$ is inserted in a suitable hole provided in pipe $a$, so as to support said cable up and away from the cable $e'$. Thus any one cable of the cables supported upon any one of the pins may be removed by lifting the cables at the rear and above, as described with respect to the cables on pin $d^2$. If more room should be required, the proper pin, as pin $d^2$, may be removed and inserted in a hole lower down, as hole $g$. Thus if pin $d^2$ were inserted in a lower hole, as hole $g$, cable $h$, for example, might be removed, being drawn under the cables of its layer and back over the cables of the layer thereunder. When pins provided with bent ends are used, they are turned down, so that the bent ends may be horizontal when it is desired to remove one of the cables.

As now usually constructed the spring-jack switches upon the board are formed into strips of twenty each, so that five strips placed one above the other would furnish terminals for a hundred lines. Each cable may contain wires for one strip of spring-jack switches—that is to say, as usually constructed this would require forty wires in each cable. As shown in Figs. 3 and 4, I preferably make the layers of cable less in number than the rows of vertical strips of spring-jack switches. Thus on pin $d'$ are placed two layers of cables, with twelve in each layer, and one layer of six cables—that is to say, thirty cables in all. These thirty cables would be sufficient for thirty strips of spring-jack switches on each multiple section. As before stated, the connections between the cables and the different strips of spring-jack switches may be in the usual manner. Thus the first cable, as cable $i$, would be connected with the lower strip of spring-jack switches of the first division of each multiple board, the next cable $i^2$ with the lower strip of each of the second divisions of all the boards, and so on to cable $i^6$. There being six divisions, the six cables $i'$ to $i^6$ would form connections with a single horizontal row of strips entirely across the whole multiple switchboard. The cables $i^7$ to $i^{12}$ would be connected in a similar manner and in the same order with the next horizontal row, and so on, thirty cables being sufficient for the connections with five such horizontal rows of spring-jack switches. These cables are, however, so disposed as to occupy less vertical space than would be the vertical space occupied by five strips of spring-jack switches.

Having thus described my invention, I claim as new and desire to secure by Letters Patent—

1. A cable-rack consisting of upright pipes and pins inserted in holes provided therein, said rack being placed at the rear of the uprights of the frame of a switchboard, whereby the frame is relieved from the weight of the cables, substantially as and for the purpose specified.

2. The combination, with the rails, of the pipes secured between the same, said pipes being provided with holes, into which the supporting-pins $d'$ $d^2$, &c., are inserted, and other holes above and below each of the holes of the supporting-pins, and one or more pins $f$, said pins supporting cables of a multiple switchboard, whereby the cables may be spread apart to permit of the removal of any one of them, substantially as and for the purpose specified.

3. The combination, with a switchboard, of a cable-rack supported at the rear of the same, said rack consisting of iron pieces or tubes provided with holes, supporting-pins inserted therein, and rails $b$ $c$, provided with castings adapted to receive the ends of the pipes, substantially as and for the purpose specified.

4. The cable-supporting pins provided with bent ends, said pins being inserted in vertical parallel series at the rear of the board, the bent ends of said pins serving to keep the cables in place when turned upwardly, but when turned to the right or left permitting the cables to be removed, substantially as described.

5. The cable-supporting pins provided with bent ends, said pins being inserted in vertical parallel series at the rear of the board and corresponding in number to the strips of spring-jacks, the bent ends of said pins serving to keep the cables in place when turned upwardly, but when turned to the right or left permitting the cables to be removed, substantially as described.

6. The combination, with the strips of spring-jack switches placed in horizontal rows upon the switchboard, of cables supported at the rear of the board and connected with said spring-jack switches, said cables being arranged in groups, each group of cables corresponding to a particular number of layers of spring-jack switches and being connected therewith, as described, and arranged in layers, the number of layers in each group being less in number than the number of corresponding vertical rows or layers of spring-jack switches.

7. The combination, with five layers of strips of spring-jack switches extending across each section of a multiple switchboard, of cables connected therewith and arranged in layers at the rear of the board, said layers being less in number than the layers of strips of spring-jack switches with which said cables are connected, whereby the cables are brought within a less vertical space than the vertical space occupied by the corresponding rows of spring-jack switches.

8. The combination, with spring-jack switches in layers, of cables at the rear thereof in layers connected with the said switches, two or more layers of switches being connected to each layer of cables, whereby space is provided between the layers of cables to remove the jacks at the rear.

9. A cable-rack consisting of upright pipes and pins inserted in holes provided therein, said rack being placed at the rear of the switchboard and supported independently of the spring-jack sections of the board, whereby the frame is relieved from the weight of the cables.

10. The combination, with spring-jack switches in layers, of cables at the rear thereof in layers connected with said switches, two or more layers of switches being connected to each layer of cables, whereby space is provided to remove the spring-jacks at the rear.

11. A multiple switchboard provided with spring-jack switches placed in horizontal subdivisions, in combination with cables connected therewith at the rear, each cable being connected with corresponding spring-jack switches on the different sections of the switchboard and laid in a horizontal plane to the rear of the spring-jack switches, the number of cables placed vertically being less than the number of vertical layers of spring-jack switches to which the same are attached.

In witness whereof I hereunto subscribe my name this 1st day of August, A. D. 1888.

WILLIAM M. GOODRIDGE.

Witnesses:
GEORGE P. BARTON,
ELLA EDLER.